US012447558B2

(12) United States Patent
Stadler et al.

(10) Patent No.: US 12,447,558 B2
(45) Date of Patent: Oct. 21, 2025

(54) WORKPIECE SUPPORT OF A PROCESSING MACHINE FOR FLAT WORKPIECES AND PROCESSING MACHINE FOR FLAT WORKPIECES COMPRISING SUCH A WORKPIECE SUPPORT AND METHOD FOR PROCESSING A FLAT WORKPIECE USING SUCH A PROCESSING MACHINE

(71) Applicant: Bystronic Laser AG, Niederoenz (CH)

(72) Inventors: Peter Stadler, Worb (CH); Sergio Bossoni, Vienna (AT)

(73) Assignee: BYSTRONIC LASER AG, Niederonz (CH)

( * ) Notice: Subject to any disclaimer, the term of this patent is extended or adjusted under 35 U.S.C. 154(b) by 0 days.

(21) Appl. No.: 16/757,913

(22) PCT Filed: Oct. 24, 2018

(86) PCT No.: PCT/EP2018/079097
§ 371 (c)(1),
(2) Date: Apr. 21, 2020

(87) PCT Pub. No.: WO2019/081550
PCT Pub. Date: May 2, 2019

(65) Prior Publication Data
US 2020/0406400 A1    Dec. 31, 2020

(30) Foreign Application Priority Data

Oct. 27, 2017    (EP) .................................. 17198873.6

(51) Int. Cl.
*B23K 26/38*    (2014.01)
*B23K 37/04*    (2006.01)
(Continued)

(52) U.S. Cl.
CPC .............. *B23K 26/38* (2013.01); *B23Q 1/037* (2013.01); *B23K 37/0408* (2013.01);
(Continued)

(58) Field of Classification Search
CPC .......... B23Q 1/037; B23Q 1/035; B23Q 1/25; B23Q 1/64; B23Q 1/5462; B23Q 1/76;
(Continued)

(56) References Cited

U.S. PATENT DOCUMENTS 4,911,284 A * 3/1990 Weihe .................... B65G 13/02
193/37
6,088,903 A * 7/2000 Matsuo ................ B23Q 11/121
29/558

(Continued)

FOREIGN PATENT DOCUMENTS

DE        195 23 198 A1    5/1996
DE    10 2013 214404 A1    1/2015
(Continued)

OTHER PUBLICATIONS

Translation of JP H11 192576.
(Continued)

*Primary Examiner* — Ibrahime A Abraham
*Assistant Examiner* — Joseph W Iskra
(74) *Attorney, Agent, or Firm* — BELAY IP

(57) ABSTRACT

The disclosure relates to a workpiece support for a processing machine for flat workpieces, wherein the workpiece support has support elements forming a plurality of support points for the workpieces which span a workpiece support plane for the flat workpiece, wherein a transfer device for transferring at least one of the support elements from a first position into at least one further position is provided. At least one support element is thus configured to be transferred from the first position into the at least one further position
(Continued)

even when a workpiece is loaded, by a movement parallel to the workpiece support plane. The disclosure also relates to a processing machine including such a workpiece support and a method for processing a workpiece.

15 Claims, 5 Drawing Sheets

(51) Int. Cl.
 *B23K 103/00* (2006.01)
 *B23Q 1/03* (2006.01)
(52) U.S. Cl.
 CPC ...... *B23K 37/0461* (2013.01); *B23K 2103/42* (2018.08); *B23Q 2240/002* (2013.01)
(58) Field of Classification Search
 CPC ........ B23Q 1/265; B23Q 1/766; B23Q 1/017; B23Q 1/26; B23Q 16/001; B23Q 2240/002; B23Q 3/04; B23Q 3/103; B23Q 3/104; B23Q 3/08; B23Q 39/028; B23Q 5/385; B23Q 5/345; B23Q 5/348; B23Q 17/2291; B23Q 7/047; B23Q 7/1426; B23K 2103/42; B23K 26/0876; B23K 26/38; B23K 37/0408; B23K 37/0461
 USPC .................................................. 219/121.72
 See application file for complete search history.

(56) References Cited

U.S. PATENT DOCUMENTS

| | | | | |
|---|---|---|---|---|
| 6,112,389 | A * | 9/2000 | Boltshauser | B23Q 7/1426 198/690.1 |
| 6,423,929 | B1 * | 7/2002 | Muller | H05K 3/0026 219/121.67 |
| 2010/0181165 | A1 | 7/2010 | Finn | |
| 2011/0132885 | A1 * | 6/2011 | Sercel | B23K 26/042 219/121.72 |
| 2016/0144464 | A1 * | 5/2016 | Zwickl | B23K 26/38 219/121.72 |
| 2016/0225134 | A1 * | 8/2016 | Tanaka | B23K 26/00 |
| 2018/0050432 | A1 * | 2/2018 | Morimura | B23Q 1/766 |

FOREIGN PATENT DOCUMENTS

| | | | | |
|---|---|---|---|---|
| JP | H09271978 A | * | 10/1997 | |
| JP | H 11 192576 A | | 7/1999 | |
| WO | WO2007/134629 | | 11/2007 | |
| WO | WO-2007134629 A1 | * | 11/2007 | ......... B23K 37/0461 |
| WO | WO 2012/002801 A1 | | 1/2012 | |

OTHER PUBLICATIONS

Translation of DE 2013 214404 A1.
Translation of DE 195 23 198 A1.
Translation of JP H09 271978 A1.
Translation of WO2007/134629 A1.

\* cited by examiner

WORKPIECE SUPPORT OF A PROCESSING MACHINE FOR FLAT WORKPIECES AND PROCESSING MACHINE FOR FLAT WORKPIECES COMPRISING SUCH A WORKPIECE SUPPORT AND METHOD FOR PROCESSING A FLAT WORKPIECE USING SUCH A PROCESSING MACHINE

CROSS REFERENCE TO RELATED APPLICATIONS

This application is a national phase application of International Application No. PCT/EP2018/079097, filed on Oct. 24, 2018, and claims the priority benefit of European patent application EP17198873.6, filed on 27 Oct. 2017, the content of both of which is incorporated herein by reference.

TECHNICAL FIELD

The invention relates to a workpiece support of a processing machine for flat workpieces according to the preamble of claim 1. The invention further relates to a processing machine according to claim 11 for flat workpieces comprising such a workpiece support and a method according to claim 12 for processing a flat workpiece using such a processing machine.

Nowadays, fully-automatic or semi-automatic processing machines for flat workpieces have a workpiece support which must ensure a stable support of the workpiece to be processed during several hundred processing processes. The workpiece support, which is also referred to as a support point or support grid, comprises a plurality of support elements with load-bearing points on which the workpiece rests. Support points or load-bearing points are spaced apart from one another, so that already processed workpiece parts of the workpiece, for example cut workpiece parts, can fall through between the support elements. Such a processing machine generally has a processing tool which can be moved relative to the workpiece support and which can come into contact with and thereby damage the support elements during processing of the workpiece, which subsequently leads to the compulsory replacement of severely damaged support elements.

BACKGROUND

DE 10 2005 025 889 B4 shows a laser processing table for supporting a plate-shaped workpiece, comprising a plurality of elongate support elements which are movably arranged between a support position and a protective position. The elongate workpiece supports are moved in a direction transverse to the workpiece support plane spanned by the support plane and are protected from the laser cutting beam in their protective position by a covering means.

The disadvantage of this known solution is that no stable support of the workpiece in the work area of the laser beam, particularly in the case of small workpieces, can be ensured. Another disadvantage is that a separate covering means must be provided for each of the elongate workpiece supports, which makes the entire structure of the workpiece support very complex and therefore extremely expensive to manufacture.

WO 2007/134628 A1 discloses a laser cutting machine comprising a workpiece support for receiving a tabular workpiece. The workpiece support has movable support elements with load-bearing point tips, on which the tabular workpiece rests, wherein the support elements of the workpiece support in the unloaded state can be positioned using a movement device in accordance with the nesting plan.

The disadvantage of this known solution is that the nesting plan of the good parts on the workpiece must be known before the workpiece support is loaded, since the support elements are positioned before the workpiece support is loaded and only in this way can the support elements be avoided by the laser cutting beam in the cutting process. This makes the entire processing process extremely inflexible.

SUMMARY

In view of limitations in the related art, an object of the present disclosure is therefore to provide a workpiece support for flat workpieces and a processing machine comprising such a workpiece support, which does not have the aforementioned disadvantages and in particular protects the workpiece support and/or the processing tool of the processing machine from mechanical deformations, as well as preserving the surface of the workpiece. Furthermore, it is the object of the present disclosure to provide a method for processing a workpiece using such a processing machine.

The above and other objects may be attained by the features of the independent claims. Advantageous developments are set out in the figures and in the dependent claims.

Objects and advantages of the disclosed embodiments may be realized and attained by the elements and combinations set forth in the claims. However, embodiments of the present disclosure are not necessarily required to achieve such, exemplary objects and advantages, and some embodiments may not achieve any of the stated objects and advantages.

According to the disclosure, a workpiece support for a processing machine for flat workpieces has a plurality of support points for support elements forming the workpieces. The support elements span a workpiece support plane for the flat workpiece. Furthermore, a transfer device is provided for transferring at least one of the support elements from a first position into at least one further position. At least one support element is thus configured to be transferred from the first position into the at least one further position even when a workpiece is loaded, by a movement parallel to the workpiece support plane.

Thus, the processing process does not have to be adjusted with regard to the support elements, since individual support elements are transferred from one position into a further position in the workpiece support plane, thus preventing a collision between the tool and the workpiece support. This means that the entire processing process can be carried out in a time-saving manner. Furthermore, the work area of the tool on the flat workpiece, regardless of the positions of the support elements on the workpiece support, can be defined before the start of the processing process and thus remains unchanged.

In this context, the meaning of the terms "transferring the at least one support element from a first position into at least one further position" is equivalent to moving, displacing or repositioning the at least one support element from one position into at least one further position. The term "processing process" includes all processes comprising at least one process work step, which are carried out using a tool for processing the flat workpiece. This includes, not exhaustively, cutting, drilling, welding or piercing.

Preferably, the at least one support element has an axis of rotation, around which the at least one support element can be rotated, wherein the axis of rotation is aligned parallel to the workpiece support plane. The at least one support element can thus be moved along the workpiece support plane without losing contact with the flat workpiece, so that the flat workpiece always rests on the support elements in a stable manner.

Preferably, a plurality of support elements each have an axis of rotation, around which the respective support element can be rotated, wherein the axes of rotation are aligned parallel to the workpiece support plane. Several support elements can thus be moved, whereby the positions of the support elements can be flexibly adapted to different processing processes and the processing processes can be carried out in a time-saving and thus cost-saving manner. The axes of rotation of the support elements are also preferably aligned parallel to one another.

The support points of the at least one support element are preferably equipped with a friction-reducing coating, in particular from the group comprising molybdenum coating, molybdenum sulphide coating, graphite coating, diamond coating, plastic coating and ceramic coating. The transfer of the at least one support element, which is always in contact with the flat workpiece, can thus easily be made from one position to at least one further position. There is thus no need to move the flat workpiece on the workpiece support, thus avoiding damage to the flat workpiece. Alternatively, the support points of the at least one support element are designed with a damage-reducing coating, for example a plastic coating or a rubber coating, so that they do not suffer any damage in the form of impressions, scratches or the like on the workpiece and/or the workpiece does not cause damage to the support elements.

A workpiece fixing device is preferably provided for fixing the flat workpiece, as a result of which the position of the workpiece remains unchanged and a previously defined nesting plan can be processed quickly and easily on the workpiece.

The workpiece fixing device is advantageously provided for fixing the flat workpiece relative to the at least one transferable support element, whereby the at least one support element can easily be transferred from the work area of the tool without moving the workpiece.

The fixing device advantageously comprises at least one stop, whereby the flat workpiece can be arranged precisely on the processing machine or the workpiece support.

The entire workpiece support is preferably displaceable along the plane. All support elements can thus be transferred simultaneously from a first position into at least one further position. With this simple measure, a collision of the tool with the at least one support element can be easily prevented. The workpiece support can be displaceable as a whole along the plane, in particular by means of the transfer device.

The at least one support element is preferably formed to be circular cylindrical, wherein the support points are formed on a cylindrical outer surface of the at least one support element. The cylindrical outer surface of the at least one support element reduces any mechanical influence on the flat workpiece when the at least one support element is transferred from one position into at least one further position. For example, this prevents the formation of a notch or a scratch on the flat workpiece.

Alternatively, the support points of the support elements are formed to be spherical, which means that mechanical stress on the workpiece is reduced in a particularly simple manner. The spherical support elements are arbitrarily and freely movable on the workpiece support and can be moved in the workpiece support plane. Thus, at least one spherical support element can be transferred freely from one position into at least one further position, when the tool penetrates the workpiece support plane.

This workpiece support advantageously has at least one delimitation, which limits the free movement of the spherical support elements in the workpiece support plane in the region of the at least one delimitation. As a result, the spherical support elements are held on the workpiece support, so that a stable support of the flat workpiece on the workpiece support is guaranteed.

The at least one delimitation is advantageously formed by an edge running laterally around the workpiece support, so that the freely movable, spherical support elements cannot fall off the workpiece support.

Alternatively or additionally, the workpiece support has at least one further delimitation within the workpiece support, which limits the free movement of the spherical support elements and thus ensures an improved stable support of the flat workpiece.

Means for detecting at least one support element in the work area of a tool of the processing machine are preferably provided, which forward detection data to the transfer device in order to initiate a transfer of the at least one support element from a first position into at least one further position. Unwanted positions of the at least one support element can thus be detected before the execution of a processing step, wherein the at least one support element is subsequently transferred into a further position. A collision of the tool of the processing machine with the at least one support element can thus be prevented. Sensors such as but not limited to a camera, a distance sensor or a position-sensitive mechanical stop can be used as means for detection.

The processing machine advantageously has a control device with a computing device for generating control commands from the detection data forwarded by the means for detection. This enables an automatic processing process.

The control device of the processing machine is advantageously connected to the drive devices of the transfer device and forwards the generated control commands to the corresponding drive devices, whereby the drive devices can carry out a fully automatic processing process.

The control device of the processing machine advantageously has a memory device in which the detection data or the generated control commands are stored, whereby the detection data or generated control commands can also be transmitted to the drive device of the transfer device with a time delay.

Alternatively or additionally, the workpiece support has a control device which processes the detection data forwarded by the means for detection into control commands. Furthermore, the transfer device initiates the transfer of the at least one support element from a first position into at least one further position, whereby the at least one support element can be transferred precisely into a corresponding position.

The control device of the workpiece support is advantageously connected to the drive devices of the transfer device and forwards the generated control commands to the corresponding drive devices, whereby the drive devices can carry out a fully automatic processing process.

The control device of the processing machine is advantageously connected to the control device of the workpiece support, so that a simple exchange of the detection data or control commands is possible.

Preferably, at least one of the support elements has a plurality of disc sections arranged at a distance from one another, said disc sections being arranged on a common axis of rotation, wherein the support points are formed circumferentially on the disc sections of the at least one support element. This ensures a stable support with a small contact area for the flat workpiece.

At least two adjacent support elements are preferably connected to one another, which improves the stability of the workpiece support.

At least two adjacent support elements are advantageously connected to one another in a spring-loaded manner, thus ensuring a flexible support situation in the workpiece support, which can be changed dynamically. Already transferred adjacent support elements can thus be easily transferred back into the original position or the rest position in the workpiece support.

At least one recess element is preferably provided for a tool of the processing machine, the at least one recess element being displaceable relative to the workpiece support plane for transferring at least one of the support elements. In this way, the at least one support element can be easily transferred and the work area of the tool can be easily secured in the processing machine, as a result of which the support elements remain uninfluenced by the tool.

The recess element is advantageously connected to a drive device for displacing the recess element, the drive device being connected to the control device of the processing machine or the transfer device. This measure enables the recess element to be moved in a controlled and precise manner.

At least one support element is preferably designed to be magnetic, so that the at least one support element is transferred without contact.

Alternatively, at least one support element is preferably designed to be magnetisable, so that the at least one support element can be transferred in a precisely controlled contact-free manner.

The at least one support element can advantageously be transferred along a plane that runs parallel to the workpiece support plane, by means of a displaceable magnetising device as a transfer device. As a result, the workpiece support is assembled in a simple manner and the transfer of the at least one support element can be carried out without contact.

A processing machine for flat workpieces according to the disclosure comprises the workpiece supports described above, which have at least some of the aforementioned features, and at least one tool for processing the flat workpiece, the tool being displaceable relative to the workpiece support. The use of the workpiece support described above in this processing machine prevents a collision of the tool of the processing machine with the at least one support element of the workpiece support when processing the workpiece.

The method according to the disclosure for processing a flat workpiece using the processing machine described above comprises the following steps:

The positioning of the flat workpiece to be processed on the workpiece support (step a)). Then, the positioning of the tool for processing the flat workpiece takes place (step b)). Subsequently, at least one of the support elements of the workpiece support is transferred out of the work area along a plane that runs parallel to the workpiece support plane, if at least one support element is determined in the work area of the tool, that is positioned for processing, of the processing head of the processing machine (step c)). The processing process is then executed (step d)).

Thus, the processing process or the nesting plan does not have to be adjusted with regard to the position of the support elements, since individual support elements can be transferred from one position to a further position in the workpiece support in the workpiece support plane. This prevents a collision between the tool and workpiece support when processing the flat workpiece.

The positioning of the flat workpiece to be processed (step a)) advantageously takes place at a stop on the workpiece support or at a stop on the processing machine. This ensures particularly simple and precise positioning of the flat workpiece to be processed.

Step c) advantageously involves moving at least one of the support elements of the workpiece support along a plane that runs parallel to that of the workpiece support plane, as a result of which a particularly simple movement sequence can be implemented.

Preferably after the positioning of the flat workpiece to be processed on the workpiece support (step a)), the flat workpiece to be processed is fixed by means of the workpiece fixing device. Using this measure, the flat workpiece remains stationary relative to the workpiece support, whereby a simplified processing process can be carried out using the tool.

The flat workpiece to be processed is advantageously fixed to a stop of the fixing device, as a result of which the flat workpiece to be processed is precisely fixed.

The entire workpiece support is preferably displaced along the plane, with the result that all support elements are simultaneously transferred from a first position into at least one further position. With this simple measure, a collision of the tool with the at least one support element is easy to prevent. The workpiece support can be displaced as a whole along the plane, in particular by means of the transfer device.

The recess element for the tool is preferably displaced relative to the workpiece support plane, wherein at least one support element is transferred from a first position into at least one further position. With this measure, the position of the workpiece relative to the tool remains unchanged, so that a fast processing process can be carried out.

The support points of the at least one support element to be transferred are preferably rolled along the workpiece support plane, as a result of which the forces acting on the flat workpiece are minimised.

The at least one magnetic or magnetisable support element is preferably activated using a magnetising device, and transferred from one position into at least one further position. With this measure, the at least one support element can be easily transferred.

After step b), the position data of the flat workpiece is preferably recorded on the workpiece support. Unwanted positions of the workpiece on the workpiece support are thus easily correctable and, subsequently, the nesting plan on the workpiece can be easily optimised.

A computer program product, which recognises detection data after loading into the storage device of the processing machine or the transfer device using a means for detection and generates at least one control command by means of the computing device of the control device, then effects the previously described method for processing a flat workpiece with the processing machine including the workpiece support. This means that the processing machine can be operated automatically and easily. In other words, the processing machine is controlled using a computer program, which can be stored in the storage device or can be downloaded as an executable program from an external instance (e.g. server), in order to perform the previously described method for processing a flat workpiece using the processing machine including the workpiece support. In particular, the computer program is used to generate control commands on the basis of detection data in order to transfer the support elements to another position as required.

Further advantages, features and details of the disclosure arise from the following description in which exemplary embodiments of the disclosure are described with reference to the drawings.

The list of reference signs, as well as the technical content of the claims and figures, are part of the disclosure. The figures are described coherently and comprehensively. The same reference signs denote the same components; reference signs with different indices indicate functionally identical or similar components.

BRIEF DESCRIPTION OF THE DRAWINGS

Further advantages, features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

In the drawings.

DETAILED DESCRIPTION

Figure 1:
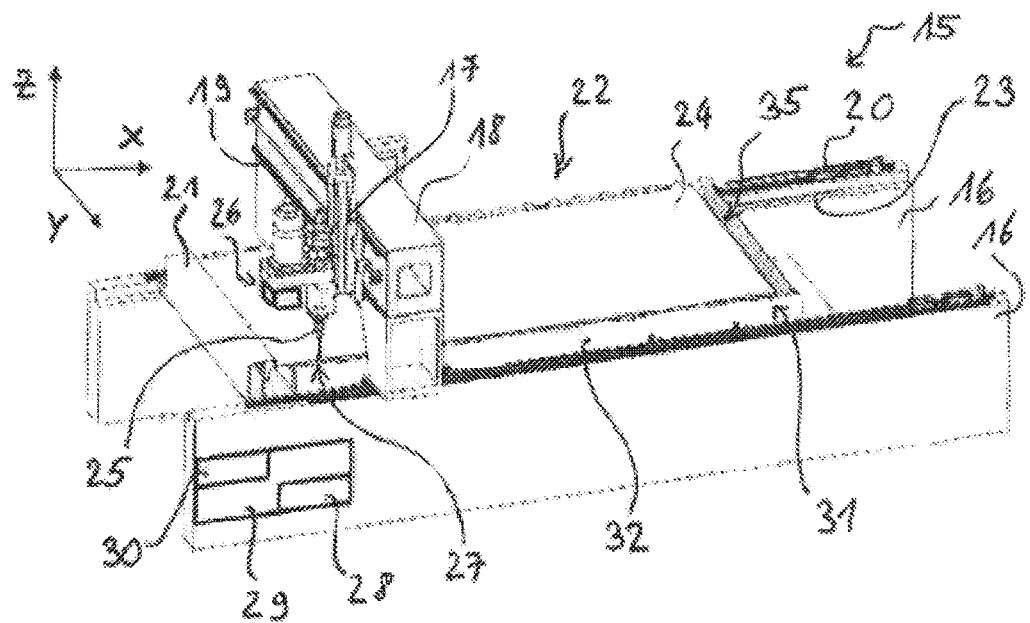
FIG. 1 shows a first embodiment of a processing machine according to the disclosure, in a perspective view.
Figure 2:
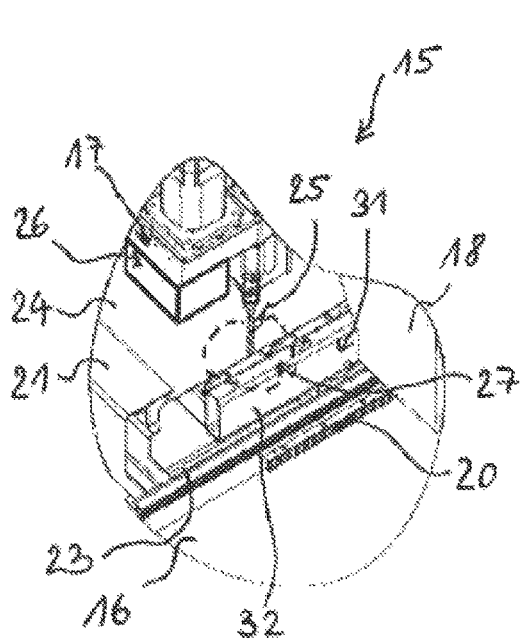
FIG. 2 shows a detailed section of the processing machine shown in FIG. 1.
Figure 3:
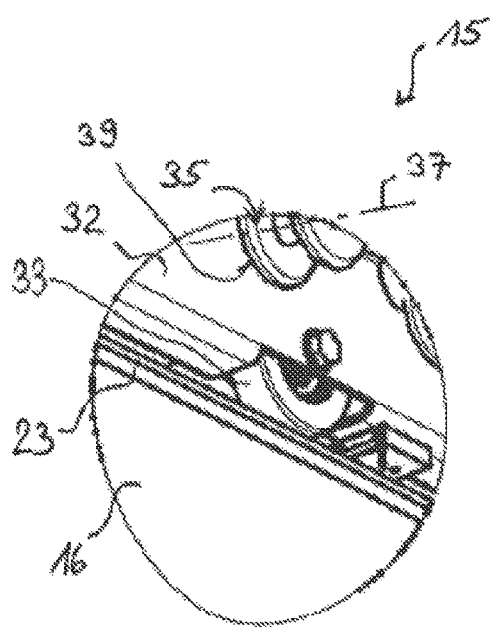
FIG. 3 shows a further detailed section of the workpiece support of the processing machine shown in FIG. 1.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

FIGS. 1 to 6 show a laser processing machine as the processing machine 15 having a base 16, comprising a laser cutting head as the processing head 17 and comprising a workpiece support 31 for a flat workpiece 24. A bridge 18 is arranged on the base 16 of the processing machine 15. The base 16 has a guide device 20 on which the bridge 18 is arranged to be movable in the X direction. The flat workpiece 24 rests on the support elements 35 and is held stable on the support elements 35 due to its weight.

Furthermore, a workpiece fixing device 21 is arranged for fixing the workpiece 24 to the base 16. The base 16 has a transfer device 22 for the workpiece support 31 with transfer rails 23, on which the workpiece support 31 is arranged to be movable in the X direction. For this purpose, the transfer device 22 further comprises at least one drive device of the processing machine 15 (not shown).

The processing head 17 is arranged on the bridge 18 and is arranged to be movable in the Y direction along a pair of rails 19. Furthermore, the processing head 17 can be moved relative to the workpiece 24. The tool 25 is arranged on the processing head 17, which, if necessary, can be exchanged with a further tool. A drilling tool, a countersinking tool, a cutting tool, such as a laser cutting tool, and a welding tool are listed, but not exhaustively, as the tool 25.

The processing head 17 comprises a means 26 for detecting the work area 27 of the tool 25, which is connected to a control device 29 of the processing machine 15 and sends detection data, such as work area data, to same. The control device 29 has a computing device 28 which generates control commands from the detection data. The control device 29 and/or the computing device 28 can be controlled by software, in particular by a computer program. The computer program can be kept in a memory device 30 or downloaded from an external instance (e.g. central server) via a data connection (bus system). The detection data is at least partially stored in the memory device 30. The means 26 used for detection includes, not exhaustively, a camera or an optical distance sensor. The detection data includes, not exhaustively, position data relating to the position of the tool 25 relative to the workpiece 24 or position data relating to the position of the tool 25 relative to the workpiece support 31. Alternatively or in addition, data from the tool 25 is also detected. For example, in laser cutting, the data of the cutting beam, such as gas pressure, cutting temperature and the like, can be detected.

Figure 4:
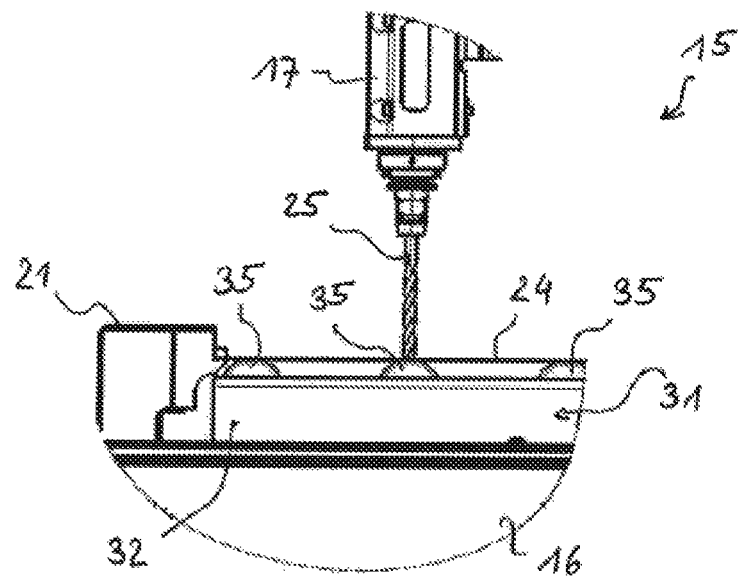
FIG. 4 shows a schematic representation of the workpiece support in a first position in a side view.
Figure 5:
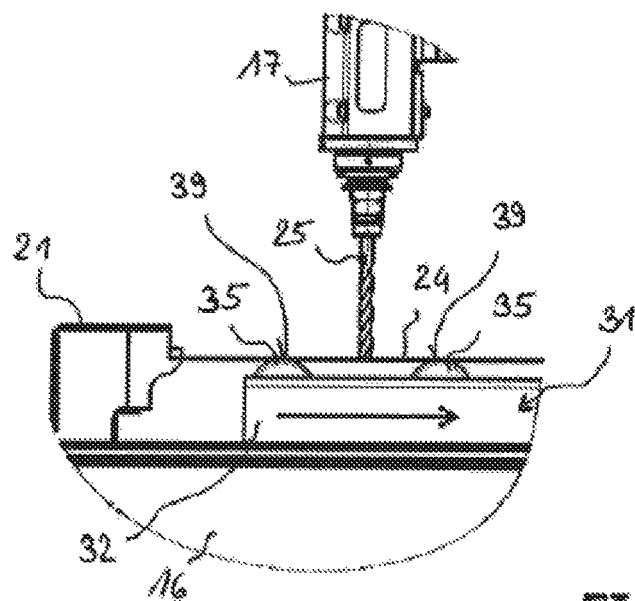
FIG. 5 shows a schematic representation of the workpiece support shown in FIG. 4, in a second position in a side view.

The workpiece support 31 has, on the workpiece support frame 32, a plurality of transfer rollers 33 which belong to the transfer device 22 and make the workpiece support 31 movable in the X direction along the transfer rail pair 23. The transfer rollers are arranged in pairs on the workpiece support frame 32. A plurality of support elements 35 are further arranged on the workpiece support frame 32, which span the workpiece support plane 36 and on which the workpiece 24 can rest. The workpiece support 31 can be moved relative to the workpiece fixing device 21 using the transfer rollers 33, so that the support elements 35 are transferred from one position into another position in the work area 27 of the tool 25, even when the workpiece 24 resting thereon is loaded. For example, the workpiece support 31 is moved along the pair of transfer rails 23 precisely when the tool 25 is arranged directly above one of the support elements 35, as shown in FIGS. 4 and 5.

Figures 6, 7:
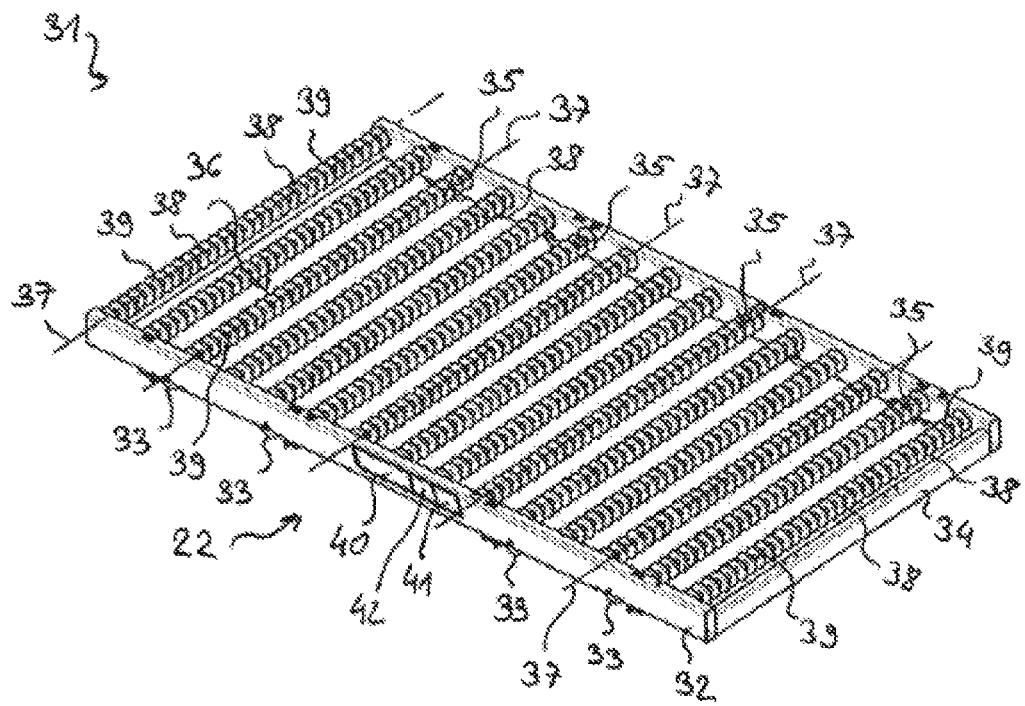
FIG. 6 shows the workpiece support of the processing machine shown in FIG. 1, in a perspective view.
FIG. 7 shows an alternative embodiment of the workpiece support shown in FIG. 6, in a perspective view.

FIG. 6 shows the workpiece support 31 in detail. A plurality of transfer rollers 33 are arranged in pairs on the workpiece support frame 32, said transfer rollers engaging in the pair of transfer rails 23 and moving there along the pair of transfer rails 23. A plurality of support elements 35 are arranged in the workpiece support frame 32, said support elements having a plurality of disc sections 38 arranged at a distance from one another. The support elements 35 extend parallel to the workpiece support frame side 34 of the workpiece support frame 32. The plurality of support elements 35 span a workpiece support plane 36 in the X direction and Y direction (X-Y plane) and each have an axis of rotation 37 about which the respective support element 35 can be rotated. The axes of rotation 37 are each aligned parallel to the workpiece support plane 36. The support elements 35 of the workpiece support 31 are configured to be transferred from a first position into a further position, even when the workpiece 24 is loaded, by a movement parallel to the workpiece support plane 36. For this purpose, the support elements 35 have a plurality of support points 39, which are formed on the circumference of the disc sections 38. The workpiece 24 lies in the positioned state with its weight on the support points 39.

Furthermore, the support points 39 in the present embodiment of the support elements 35 are equipped with a friction-reducing coating from the group comprising molybdenum coating, molybdenum sulphide coating, graphite coating, diamond coating, plastic coating and ceramic coating. Alternatively, the support points of the at least one support element are designed with a damage-reducing coating, for example a plastic coating or a rubber coating, so that they do not suffer any damage in the form of impressions, scratches or the like on the workpiece and/or the workpiece does not cause damage to the support elements. Alternatively, the support elements have no coating.

The workpiece support 31 has, in the area of the workpiece support frame 32, means 40 for detecting at least one support element 35 in relation to the work area 27 of the tool 25 of the processing machine 15, which is connected to a control device 29 of the processing machine 15 and sends detection data, such as position data, to same. The position data are at least partially stored in a storage device 30 of the processing machine 15. The means 40 used for detection includes, not exhaustively, a camera, an optical distance sensor or a mechanical stop sensor. The position data includes, not exhaustively, data relating to the position of the tool 25 relative to the workpiece 24, data relating to the position of the tool 25 relative to the workpiece support 31 or data relating to the position of the support elements 35 in the region of the tool 25 of the processing machine 15. The detection data, for example the position data of a support element 35, are forwarded to the transfer device 22, so that, if necessary, a transfer of one or more support elements 35 from a first position into a further position is initiated if a support element 35 or a plurality of support elements 35 is located in or at the work area of the tool 25. If necessary, the transfer device 22 has its own control device 41 comprising a computing device 42, which processes the detection data into control commands and initiates the transfer of one or more support elements 35 from a first position into a further position. For this purpose, the transfer device 22 has its own drive device (not shown). This control device 41 and/or this computing device 42 can also be controlled by means of software or a computer program.

The method for processing the flat workpiece 24 is described with reference to the processing machine 15 shown in FIGS. 1 to 6 and comprises the steps outlined below:

Firstly, the flat workpiece 24 to be processed is positioned on the workpiece support 31, so that it rests on the support points 39 of the support elements 35.

The flat workpiece 24 is either arranged at a stop in the area of the workpiece fixing device 21 on the processing machine 15 and/or the position of the workpiece 24 is detected by the means 26 for detection, so that the position data of the flat workpiece 24 on the workpiece support 31 can be easily detected.

The flat workpiece 24 to be processed is then fixed by means of the workpiece fixing device 21 and the nesting plan for processing the workpiece 24 is transmitted.

Then, taking into account the defined nesting plan, the tool 25 is positioned for processing the flat workpiece 24. The position data of the at least one support element 35 is then detected using the means 26 for detection on the processing head 17 or using the means 40 for detection on the workpiece support 31 on which the workpiece 24 rests.

The detected position data is then compared with the previously known work area 27 of the tool 25. If the at least one support element 35 is located in the work area 27 of the tool 25, at least one control command is generated using the computing device 28 of the control device 29.

Subsequently, using the generated control command and the drive device controlled thereby, at least one of the support elements 35 of the workpiece support 31 is transferred or moved out of the work area 27 of the tool along the plane (X-Y plane) which runs parallel to the workpiece support plane 36, if at least one support element 35 is determined in the work area 27 of the tool, positioned for processing 25, of the processing head 17 of the processing machine 15. The support elements 35 and their support points 39 are rotated about their respective axes of rotation 37 and roll on the fixed workpiece 24 along the X-Y plane.

The transfer of the at least one support element 35 of the workpiece support 31 takes place in this embodiment of the workpiece support 31 by displacing the entire workpiece support 31 along the X-Y plane.

The processing process is then executed on the workpiece 24.

The previously described method is alternatively partially executed in a computer program product which, after loading into the storage device 30 of the processing machine 15 or the workpiece support 31, detects detection data using one of the means 26, 40 for detection and generates control commands by means of one of the computing devices 28, 42 of the control device 29, 41. The computer program product then effects the previously described method for processing a flat workpiece 24 using the processing machine 15 including the workpiece support 31.

FIG. 7 shows a further embodiment of a workpiece support 431, which differs from the workpiece support 31 that is shown in FIG. 6 and described above only in terms of the embodiment of the support elements 435.

The workpiece support 431 has a plurality of support elements 435, which are circular cylindrical and are arranged on the workpiece support frame 432. The support elements 435 span the workpiece support plane 436 and have support points 439 which are formed on the cylindrical outer surface of the support elements 435 and can be hardened or provided with a friction-reducing or damage-preventing coating. The support elements 435 are arranged parallel to the workpiece frame side 434 and are each rotatably mounted about their axes of rotation 437. As already shown above, the workpiece support frame 432 has a plurality of transfer rollers 433, which are arranged in pairs on the workpiece support frame 432.

The transfer device 422 has its own control device 441 comprising a computing device 442 and furthermore has its own means 440 for detection of detection data. The control device 441 processes the detection data into control commands and initiates the transfer of one or more support elements 435 from a first position into a further position. For this purpose, the transfer device 422 has its own drive device (not shown).

Figure 8:
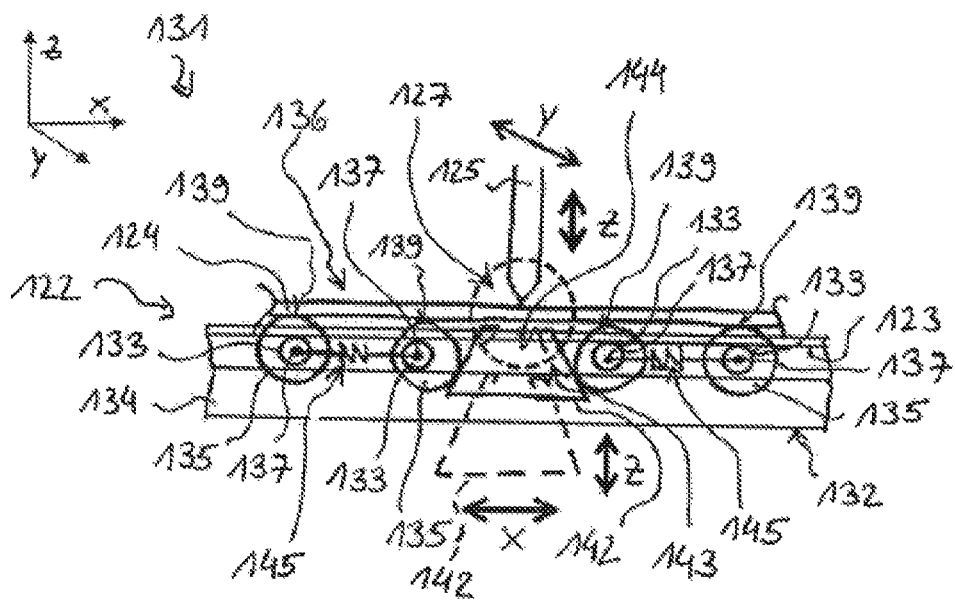
FIG. 8 shows an alternative embodiment of a workpiece support for the processing machine shown in FIG. 1, in a schematic representation in a side view.

The alternative workpiece support 131 shown in FIG. 8 has a recess element 142 for the tool 125, between the support elements 135. The workpiece 124 rests on the support points 139 of the support elements 135, which are coated with a friction-reducing coating. The recess element 142 has a recess space 143 and a recess opening 144, the tool 125 being able to penetrate into the recess space 143 of the recess element 142 via the recess opening 144 during the processing process. The recess element 142 can be displaced relative to the tool 125 or the workpiece 124 (Z direction) as well as parallel to the workpiece support plane 136 (X-Y plane). If necessary, the recess element 142 is positioned directly in the work area 127 of the tool 125, so that the support elements 135 present there are transferred from one position into a further position by a movement parallel to the workpiece support plane 136 (X-Y plane). The recess element 142 is thus a further component of the transfer device 122.

The workpiece support frame 132 has a recess with a pair of transfer rails 123 on two opposite workpiece frame sides 134. The support elements 135 each have a transfer roller 133 at their opposite ends. The transfer rollers 133 of the support elements 135 engage in the pair of transfer rails 123, whereby the support elements 135 are guided along the pair of transfer rails 123. Two support elements 135 are connected to each other using a spring device 145 and are each rotatable about their axes of rotation 137. The recess element 142 is connected to a drive device for displacing the recess element 142 (not shown), the drive device being connected to the control device of the processing machine 15 or the workpiece support 131.

Figure 9:
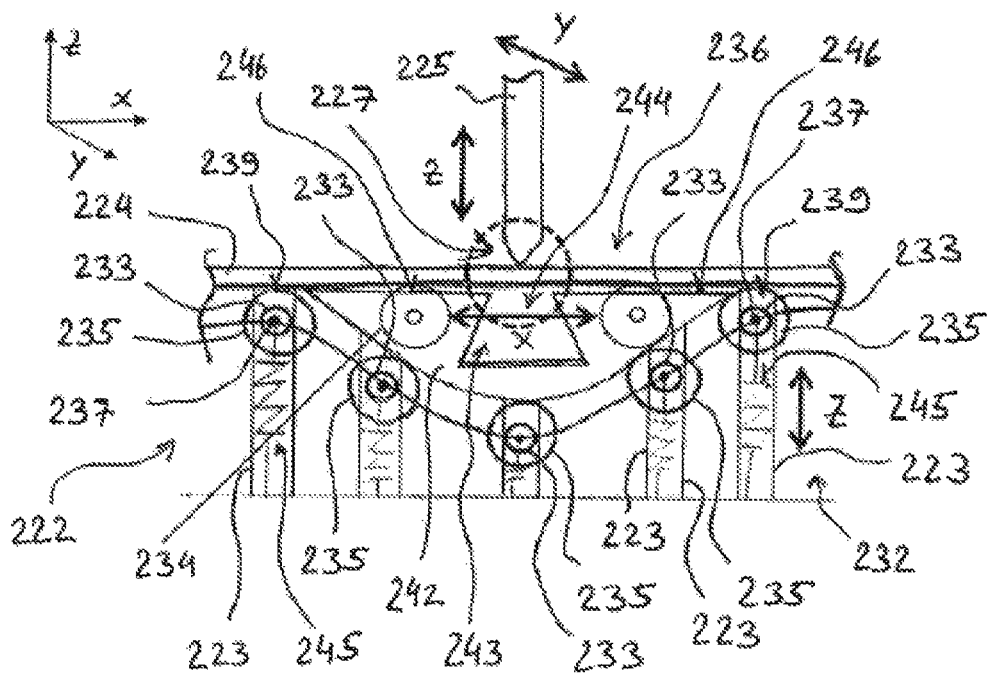
FIG. 9 shows a further alternative embodiment of a workpiece support for the processing machine shown in FIG. 1, in a schematic representation in a side view.

The workpiece support 231 shown in FIG. 9 has a recess element 242 with integrated support elements 234, between the support elements 235 and the workpiece 224. The workpiece 224 rests on the support points 239 of the support elements 235, which are coated with a friction-reducing coating. The recess element 242 has a recess space 243 and a recess opening 244 and can be displaced parallel to the workpiece support plane 236 (X-Y plane), so that the support elements 235 positioned there are transferred from one position into a further position. The recess element 242 is thus a component of the transfer device 222. The integrated support elements 234 are arranged on both sides of the recess opening 243 and allow the recess element 242 to be rolled off on the side of the workpiece 224 facing it. The recess element 242 has support points 246 on which the workpiece 224 rests. The support elements 235 are connected to one another here and are further connected to the workpiece support frame 232 by means of a spring device 245. The support elements 235 which are thus spring-mounted can be moved relative to the workpiece support frame 232. In addition, the support elements 235 each have transfer rollers 233 which engage in the vertically arranged pair of transfer rails 223 of the workpiece support frame 232. If necessary, the recess element 242 is inserted directly into the work area 227 of the tool 225. The recess element 242 is connected to a drive device for displacing the recess element 242 (not shown), this drive device being connected to the control device of the workpiece support 231 or the processing machine 15.

Figure 10:
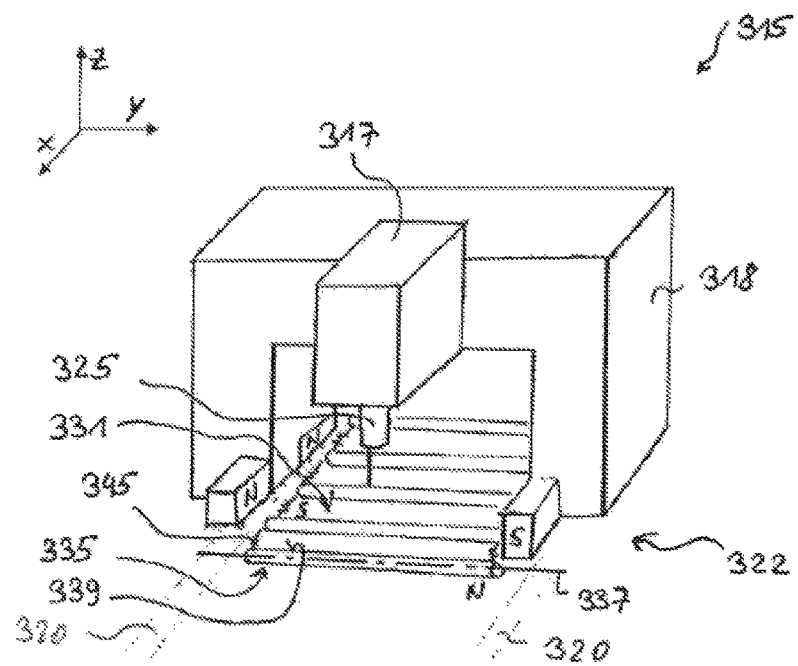
FIG. 10 shows the processing machine according to the disclosure according to FIG. 1, with a further embodiment of the workpiece support and the transfer device with a support element in a first position in a perspective view.
Figure 11:
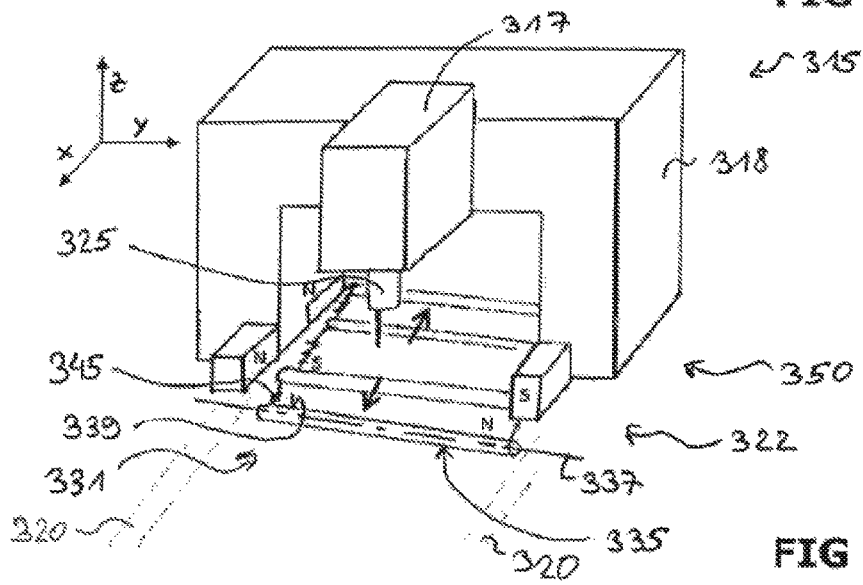
FIG. 11 shows the processing machine according to FIG. 10 with the support element of the workpiece support in a further position, in a perspective view.

FIGS. 10 and 11 show a further embodiment of a processing machine 315, which differs with respect to the processing machine 15 described above only with regard to some of the features of the transfer device 322. The processing machine 315 shows a bridge 318 which can be moved along the guide device 320, together with a processing head 317 and a tool 325 arranged thereon. Furthermore, the processing machine 315 has a workpiece support 331 and a magnetising device 350 as transfer device 322 for transferring the support elements 335 from one position into a further position. The support elements 335 of the workpiece support 331 consist, at least in part, of a magnetic material. In the illustrated embodiment, the magnetising device 350 is arranged on the bridge 318 of the processing machine 315 and can be displaced with the bridge 318 along the X-Y plane, which is aligned parallel to the workpiece support plane 336. Alternatively, the magnetising device 350 can be moved as a separate unit and, for example, independently of the bridge 318. The magnetising device 350 has a plurality of permanent magnets or a plurality of electromagnets which move individual or a plurality of support elements 335 along the workpiece support plane 336. The support elements 335 are connected to one another at their respective ends by means of a spring device 345 and can be rotated about their axes of rotation 337. The support elements 335 have support points 339, on which the workpiece is positioned and which are advantageously coated with a friction-reducing coating.

In an alternative embodiment, the previously described support elements 335 consist of a magnetisable material. These support elements 335 are magnetised beforehand using the magnetising device 350 and can then be transferred along the workpiece support plane 336 by means of the magnetising device 350.

Thus, the previously described support elements 335 made of magnetic or magnetisable materials are activated for transfer using a magnetising device 350 and then transferred from one position into a further position. For this purpose, the magnetising device 350 with the bridge 318 is moved along the guide device 320, the support points 339 of the support element 335 to be transferred rolling on the workpiece along the workpiece support plane 336.

In an alternative embodiment, the floating workpiece support 331 of the processing machine 315 shown has the previously described workpiece support frame with a pair of transfer rails. The support elements 335 each have a transfer roller at their respective ends. Magnetic or magnetisable support elements 335 can thus be transferred in a controlled manner in the transfer rails.

The present disclosure has been described, for illustrative but non-limiting purposes, according to preferred embodiments thereof, but it is to be understood that variations and/or modifications can be made by experts in the field, without for this reason going beyond the relative scope of protection.

The invention claimed is:

1. A workpiece support for a processing machine for flat workpieces, the workpiece support comprising:
    a workpiece support frame;
    support elements comprising cylindrical components with axes of rotation aligned parallel to a workpiece support plane, each of the support elements form a plurality of support points for the workpieces along a circularshaped surface, and span the workpiece support plane for at least one of the flat workpieces, a transfer device comprising transfer rollers configured to engage a pair of transfer rails of a base of the processing machine, and the transfer device configured to transfer at least one of the support elements from a first position into at least one further position, wherein at least one support element of the support elements is configured to be transferred under load of the at least one of the flat workpieces a workpiece by a movement parallel to the workpiece support plane from the first position into the at least one further position;

the at least one support element is a non-driven support element and has an axis of rotation around which the at least one support element is rotatable;

the axis of rotation is aligned parallel to the workpiece support plane the entire workpiece support is configured to be displaceable along the support plane; and the support elements comprise at least two adjacent support elements arranged on the axis of rotation.

2. The workpiece support according to claim 1, further comprising a plurality of the support elements each have an axis of rotation around which the respective support element is rotatable, wherein the axes of rotation are aligned parallel to the workpiece support plane.

3. The workpiece support according to claim 1, wherein the support points of the at least one support element are equipped with a friction-reducing coating comprising at least one of molybdenum coating, molybdenum sulfide coating, graphite coating, diamond coatings, plastic coatings and ceramic coatings.

4. The workpiece support according to claim 1, further comprising a workpiece fixing device comprising at least one stop or clamp configured for fixing the flat workpiece.

5. The workpiece support according to claim 1, wherein the at least one support element is circular cylindrical, and wherein the support points are formed on a cylindrical outer surface of the at least one support element.

6. The workpiece support according to claim 1, further comprising a detecting element comprising at least one sensor selected from a camera, a distance sensor, or a position-sensitive stop arranged and configured for detecting at least one support element in a work area of a tool of the processing machine, which forward detection data to the transfer device in order to initiate a transfer of the at least one support element from the first position to at least one further position.

7. The workpiece support according to claim 1, wherein at least one of the support elements has a plurality of disc sections arranged at a distance from one another, the disc sections being arranged on a common axis of rotation, wherein the support points are formed circumferentially on the disc sections of the at least one support element.

8. The workpiece support according to claim 1, wherein the least two adjacent support elements are connected to one another in a spring-loaded manner.

9. The workpiece support according to claim 1, further comprising at least one recess element for a tool of the processing machine, wherein the at least one recess element is displaceable relative to the workpiece support plane for transferring at least one of the support elements.

10. The workpiece support according to claim 1, wherein at least one support element is designed to be magnetic or magnetisable and the at least one support element is arranged to be transferred by means of a displaceable magnetising device as the transfer device along a plane running parallel to that of the workpiece support plane.

11. A processing machine for flat workpieces comprising:
a workpiece support frame;
a workpiece support for the processing machine for flat workpieces, the workpiece support comprising support elements, each of the support elements form a plurality of support points for the workpieces and span a workpiece support plane for the flat workpiece;
a transfer device comprising transfer rollers configured to engage a pair of transfer rails of a base of the processing machine, and the transfer device configured to transfer at least one of the support elements from a first position into at least one further position is provided, wherein:
at least one support element of the support elements is configured to be transferred under load of at least one of the flat workpieces by a movement parallel to the workpiece support plane from the first position into the at least one further position;
the at least one support element has an axis of rotation around which the at least one support element is rotatable; and
the axis of rotation is aligned parallel to the workpiece support plane; and an entire workpiece support is displaceable along the plane, and
at least one tool for processing at least one of the flat workpieces, the tool being displaceable relative to the workpiece support.

12. A method for processing a flat workpiece using a processing machine comprising the steps of:
providing a workpiece support frame;
providing a workpiece support for the processing machine for flat workpieces, the workpiece support comprising support elements, each of the support elements form a plurality of support points for the workpieces and span a workpiece support plane for the flat workpiece;
providing a transfer device comprising transfer rollers configured to engage a pair of transfer rails of a base of the processing machine and the transfer device configured to transfer at least one of the support elements from a first position into at least one further position is provided,
providing at least one support element of a the support elements is configured to be transferred under load of a workpiece by a movement parallel to the workpiece support plane from the first position into the at least one further position;
 i. wherein the support elements comprise cylindrical components with axes of rotation aligned parallel to the workpiece support plane;
 ii. wherein the at least one support element has an axis of rotation around which the at least one support element is rotatable; and
 iii. wherein the axis of rotation is aligned parallel to the workpiece support plane; and an entire workpiece support is displaceable along the plane, and
providing at least one tool for processing the flat workpiece, the tool being displaceable relative to the workpiece support; positioning the flat workpiece to be processed on the workpiece support; positioning of the tool for processing at least one of the flat workpieces; and at least one of transferring and moving at least one of the support elements of the workpiece support along a plane that runs parallel to the workpiece support plane, starting from the work area, if at least one support element is determined in a work area of the tool, positioned for processing, of a processing head of the processing machine, the entire workpiece support being displaced along the plane; and execution of a processing process.

13. The method according to claim 12, further comprising the steps of, after positioning the flat workpiece to be processed on the workpiece support, fixing the flat workpiece to be processed by means of the workpiece fixing device.

14. The method according to claim 12, further comprising the steps of displacing the recess element for the tool relative to the workpiece support plane, wherein at least one support element is transferred from a first position into at least one further position.

15. The method according to claim 12, further comprising the steps of providing a non-transitory computer storage medium encoded with a computer program, the program comprising instructions that when executed by one or more computer-based data processing units cause the step of at least one transferring or moving to be performed when the computer program is loaded or executed on the computer-based data processing unit.

* * * * *